United States Patent
Signore (10) Patent No.: US 8,970,794 B2
(45) Date of Patent: Mar. 3, 2015

(54) PORTABLE VIDEO ENHANCEMENT APPARATUS

(76) Inventor: Mario Signore, Venice, CA (US)

(*) Notice: Subject to any disclaimer, the term of this patent is extended or adjusted under 35 U.S.C. 154(b) by 439 days.

(21) Appl. No.: 13/397,040

(22) Filed: Feb. 15, 2012

(65) Prior Publication Data

US 2013/0208191 A1  Aug. 15, 2013

(51) Int. Cl.
- H04N 5/72 (2006.01)
- H04M 1/00 (2006.01)
- H04B 1/38 (2006.01)
- G02B 27/02 (2006.01)

(52) U.S. Cl.
CPC .................................... *G02B 27/027* (2013.01)
USPC ........................ 348/832; 455/566; 455/575.3

(58) Field of Classification Search
USPC ................... 348/734, 41–161, 832
See application file for complete search history.

(56) References Cited

U.S. PATENT DOCUMENTS

| | | | |
|---|---|---|---|
| 6,628,320 B2 | 9/2003 | Mukai | |
| 7,009,650 B2 | 3/2006 | Kashio | |
| 7,508,386 B2 | 3/2009 | Kashio | |
| 7,671,886 B2 | 3/2010 | Sawada | |
| 7,706,677 B2 * | 4/2010 | Cho et al. | 396/287 |
| 7,792,550 B2 * | 9/2010 | Lishan | 455/566 |
| 2007/0105603 A1 * | 5/2007 | Lishan | 455/575.3 |
| 2007/0222954 A1 * | 9/2007 | Hattori | 353/122 |
| 2012/0244910 A1 * | 9/2012 | Hsu | 455/566 |
| 2013/0135871 A1 * | 5/2013 | Harooni | 362/268 |

* cited by examiner

*Primary Examiner* — Sath V Perungavoor
*Assistant Examiner* — Talha Nawaz (57) ABSTRACT

A Portable Video Enhancement Apparatus. The apparatus includes a magnification lens, a video device holder and a collapsible housing. In operational mode configuration, the collapsible housing is designed to provide a viewing cavity and a stable medium for the magnification lens and the video device holder. In portable mode configuration, the collapsible housing is designed to have a relatively small volume. The collapsible housing comprises a plurality of support members. The magnification lens and video device holder are situated within the collapsible housing. The magnification lens and video device holder are designed to have different positions within the collapsible housing depending on whether the apparatus is in operational mode configuration or portable mode configuration.

19 Claims, 7 Drawing Sheets

FIG. 1

FIG. 2A Front View

FIG. 2B Side View (Note: FIGS 1-7 are NOT drawn to scale)

FIG. 3
Front View (Note: FIGS 1-7 are NOT drawn to scale)

Side View
FIG. 4

Top View
FIG. 5

FIG. 6

Side View
FIG. 7

(Note: FIGS 1-7 are NOT drawn to scale)

PORTABLE VIDEO ENHANCEMENT APPARATUS

BACKGROUND OF THE INVENTION

The Portable Video Enhancement Apparatus is generally in the field of video magnification devices.

Typical video magnification devices are expensive closed circuit television devices that rely on electricity. These devices require separate physical support for a video playback device, are subject to glare from ambient light and allow uninvited viewing of the video display by nearby people.

A need exists for video magnification devices that are inexpensive, provide physical support for a video playback device, help prevent glare from ambient light, help prevent uninvited viewing of the video display and do not rely on electricity. Such devices provide an environmentally friendly alternative to larger viewing devices.

BRIEF DESCRIPTION OF THE DRAWINGS

All FIGURES are not drawn to scale.

DETAILED DESCRIPTION OF THE INVENTION

Described herein is Portable Video Enhancement Apparatus.

Definitions

The following definition(s) and acronym(s) are used herein:
Definition(s):
Sheet Magnifier—a magnifier comprising many narrow concentric ring-shaped lenses wherein the combination acts as a single lens having a much thinner width than a standard single convex lens.
Acronym(s):
PVEA—Portable Video Enhancement Apparatus The portable video enhancement apparatus (PVEA) is a collapsible, lightweight, durable, mobile, inexpensive video magnification device designed to magnify handheld video playback devices such as smartphones and multimedia devices sold under the trademarks IPHONE, ITOUCH, SONY PSP, ARCHOS 5, COWAN S9, DROID, BLACKBERRY, SIPS P3 and COBY MP. The PVEA is sold under the trademark EYEBOX. The PVEA includes a magnification lens, a video device holder and a collapsible housing. The magnification lens is designed to magnify a video display of a video device. The video device holder is designed to mate with a video device. The collapsible housing is designed to retain the magnification lens and video device holder. The collapsible housing is further designed to provide a viewing cavity when the PVEA is in operational mode and to transform into a relatively flat object having a relatively small volume when in portable mode. The viewing cavity in operational mode is designed to help reduce glare from ambient light and prevent others from viewing the video display and magnification lens.

Figure 1:
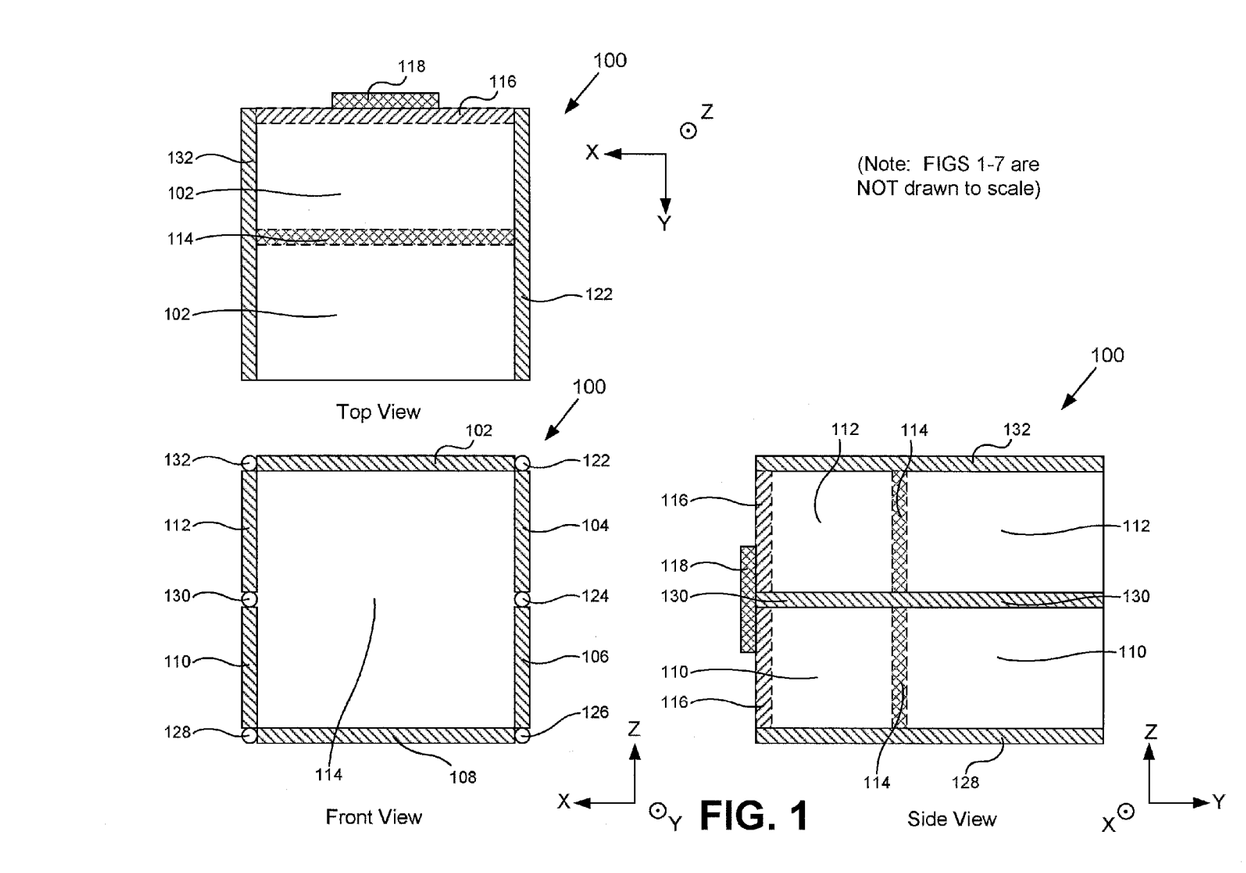
FIG. 1 is a front, side and top view of one embodiment of a portable video enhancement apparatus in operational mode.

FIG. 1 is a front, side and top view of one embodiment of a portable video enhancement apparatus in operational mode. As shown in FIG. 1, portable video enhancement apparatus 100 includes support member 102, support member 104, support member 106, support member 108, support member 110, support member 112, magnification lens 114, video device holder 116, video device coupler 118, support coupler 122, support coupler 124, support coupler 126, support coupler 128, support coupler 130 and support coupler 132. PVEA 100 forms a collapsible housing when support couplers 122, 124, 126, 128, 130, 132 are operatively coupled to support members 102, 104, 106, 108, 110, 112. Top and side views of FIG. 1 include outline views of magnification lens 114 and video device holder 116 noted by dashed outlines.

Magnification lens 114 comprises a lens designed to magnify an object such as a video display of a video device. In one embodiment, magnification lens 114 comprises a convex lens. In one embodiment, magnification lens 114 comprises a sheet magnifier. In one embodiment, magnification lens 114 comprises a Fresnel lens. In one embodiment, magnification lens 114 comprises a plastic lens. In one embodiment, magnification lens 114 comprises a plastic Fresnel lens. In one embodiment, magnification lens 114 comprises a lens having an aspect ratio of 1.5:1. In one embodiment, magnification lens 114 comprises a lens having an aspect ratio of 4:3. In one embodiment, magnification lens 114 comprises a lens having an aspect ratio of 16:9. In one embodiment, magnification lens 114 has the following dimensions: length approximately equal to 4.21 inches, width approximately equal to 6.417 inches and thickness approximately equal to 0.078 inches. In one embodiment, magnification lens 114 has the following range of dimensions: length approximately equal to between 4 inches and 6 inches, width approximately equal to between 5 inches and 7 inches and thickness approximately equal to between 0.05 inches to 1 inch.

Video device holder 116 comprises a durable material such as neoprene, rubber, plastic, recycled plastic, plastic, recycled plastic, polycarbonate, stainless steel, aluminum and titanium. In one embodiment, video device holder 116 has the following dimensions: length approximately equal to 4.3 inches, width approximately equal to 6.5 inches and thickness approximately equal to 0.078 inches. In one embodiment, video device holder 116 has the following range of dimensions: length approximately equal to between 4 inches and 10 inches, width approximately equal to between 5 inches and 11 inches and thickness approximately equal to between 0.078 inches to 1 inch.

Video device holder 116 is designed to operatively couple a video device to PVEA 100 so that a video display of the video device can be viewed through magnification lens 114 when PVEA 100 is in operational mode. In one embodiment, video device holder 116 comprises a wall having a cutout for viewing a video display. Video device holder 116 further comprises video device coupler 118. Video device coupler 118 is designed to operatively couple a video device to video device holder 116. In one embodiment, video device coupler 118 has the following dimensions: length approximately equal to 4 inches, width approximately equal to 2.5 inches and thickness approximately equal to 0.75 inches. In one embodiment, the dimensions of video device coupler 118 are based on the dimensions of the video device to be coupled. In one embodiment, video device coupler 118 comprises walls forming a substantially rectangular cavity designed to retain a substantially rectangular video device such as a smartphone. In one embodiment, video device coupler 118 comprises walls forming a substantially rectangular cavity having an opening on the Z-Y plane to facilitate quick mating and unmating of a video device. In one embodiment, video device coupler 118 comprises a hook and loop fastener. Magnification lens 114 and video device holder 116 are operatively coupled within a collapsible housing of PVEA 100 described below such that magnification lens 114 and video device holder 116 fold substantially flat within the collapsible housing when PVEA 100 is in portable mode as described below with reference to FIGS. 2A and 2B.

Support members 102, 104, 106, 108, 110, 112 comprise a durable, rigid material such as plastic, recycled plastic, polycarbonate, stainless steel, aluminum and titanium. In one embodiment, support member 102 has the following dimensions: length approximately equal to 6.69 inches, width approximately equal to 6.53 inches and thickness approximately equal to 0.078 inches. In one embodiment, support member 102 has the following range of dimensions: length approximately equal to between 6 inches and 8 inches, width approximately equal to between 6 inches and 8 inches and thickness approximately equal to between 0.05 inches to 1 inch. In one embodiment, support member 104 has the following dimensions: length approximately equal to 3.346 inches, width approximately equal to 2.14 inches and thickness approximately equal to 0.078 inches. In one embodiment, support member 104 has the following range of dimensions: length approximately equal to between 3 inches and 5 inches, width approximately equal to between 2 inches and 4 inches and thickness approximately equal to between 0.05 inches to 1 inch. In one embodiment, support member 106 has the following dimensions: length approximately equal to 3.346 inches, width approximately equal to 2.14 inches and thickness approximately equal to 0.078 inches. In one embodiment, support member 106 has the following range of dimensions: length approximately equal to between 3 inches and 5 inches, width approximately equal to between 2 inches and 4 inches and thickness approximately equal to between 0.05 inches to 1 inch. In one embodiment, support member 108 has the following dimensions: length approximately equal to 6.69 inches, width approximately equal to 6.53 inches and thickness approximately equal to 0.078 inches. In one embodiment, support member 108 has the following range of dimensions: length approximately equal to between 6 inches and 8 inches, width approximately equal to between 6 inches and 8 inches and thickness approximately equal to between 0.05 inches to 1 inch. In one embodiment, support member 110 has the following dimensions: length approximately equal to 3.34 inches, width approximately equal to 2.14 inches and thickness approximately equal to 0.078 inches. In one embodiment, support member 110 has the following range of dimensions: length approximately equal to between 3 inches and 5 inches, width approximately equal to between 2 inches and 4 inches and thickness approximately equal to between 0.05 inches to 1 inch. In one embodiment, support member 112 has the following dimensions: length approximately equal to 3.346 inches, width approximately equal to 2.14 inches and thickness approximately equal to 0.078 inches. In one embodiment, support member 112 has the following range of dimensions: length approximately equal to between 3 inches and 5 inches, width approximately equal to between 2 inches and 4 inches and thickness approximately equal to between 0.05 inches to 1 inch.

Support couplers 122, 124, 126, 128, 130, 132 comprise a fastening means for operatively coupling support members 102, 104, 106, 108, 110, 112 to each other. Support couplers 122, 124, 126, 128, 130, 132 are designed to allow adjacent support members to pivot with respect to the Z-X plane. For example, support coupler 122 allows support members 102 and 104 to pivot such that the angle between support members 102 and 104 can change relative to the Z-X plane. In one embodiment, support couplers 122, 124, 126, 128, 130, 132 comprise tape such as duct tape, packing tape, KEVLAR tape, masking tape and electrical tape. In one embodiment, support couplers 122, 124, 126, 128, 130, 132 comprise an exterior membrane stitched to an interior membrane as described further below with reference to FIG. 3. In one embodiment, support couplers 122, 124, 126, 128, 130, 132 comprise hinges. In one embodiment, support couplers 122, 124, 126, 128, 130, 132 comprise hook and loop fasteners such as fasteners sold under the trademark VELCRO. In one embodiment, support couplers 122, 124, 126, 128, 130, 132 comprise flexible glue.

A collapsible housing is formed when support couplers 122, 124, 126, 128, 130, 132 operatively couple support members 102, 104, 106, 108, 110, 112 to each other as now described. As shown in FIG. 1, support member 102 is operatively coupled to support member 104 via support coupler 122. Support member 104 is operatively coupled to support member 106 via support coupler 124. Support member 106 is operatively coupled to support member 108 via support coupler 126. Support member 108 is operatively coupled to support member 110 via support coupler 128. Support member 110 is operatively coupled to support member 112 via support coupler 130. Support member 112 is operatively coupled to support member 102 via support coupler 132. A collapsible housing is formed in this manner due to the support coupler being designed to allow adjacent support members to pivot with respect to the Z-X plane. In operational mode, magnification lens 114 and video device holder 116 provide internal support for the collapsible housing to form a substantially rectangular parallelopiped cavity for viewing a video display of a video device. In operational mode, magnification lens 114 and video device holder 116 are substantially parallel to each other; and a video display may be viewed through magnification lens 114 and video device holder 116 with respect to a viewing plane that is parallel to the Z-X plane. In one embodiment, magnification lens 114 and video device holder 116 are operatively coupled to support member 108 so that magnification lens 114 and video device holder 116 are designed to pivot with respect to the Z-Y plane. Because magnification lens 114 is situated substantially within the collapsible housing in operational mode, the substantially rectangular parallelopiped cavity helps reduce glare from ambient light and helps prevent others from viewing a video display through magnification lens 114.

Figure 2A:
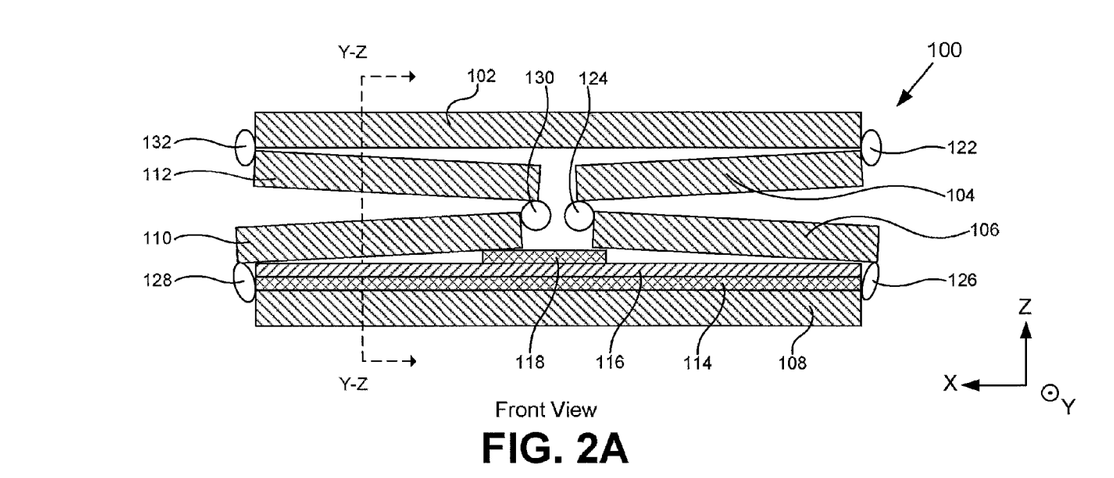
FIG. 2A is a front view of one embodiment of a portable video enhancement apparatus in portable mode.

FIG. 2A is a front view of one embodiment of a portable video enhancement apparatus in portable mode. FIG. 2A is substantially similar to FIG. 1, and thus, similar components are not described hereinagain. Support member 102 is operatively coupled to support member 104 via support coupler 122. Support member 104 is operatively coupled to support member 106 via support coupler 124. Support member 106 is operatively coupled to support member 108 via support coupler 126. Support member 108 is operatively coupled to support member 110 via support coupler 128. Support member 110 is operatively coupled to support member 112 via support coupler 130. Support member 112 is operatively coupled to support member 102 via support coupler 132. As shown in FIG. 2A, the collapsible housing of PVEA 100 forms a relatively flat object having a relatively small volume. Support members 102, 104, 106, 108, 110, 112 are situated substantially parallel to each other. Magnification lens 114, video device holder 116 and video device coupler 118 are situated within the collapsible housing and are substantially parallel to support members 102, 104, 106, 108, 110, 112.

Figure 2B:
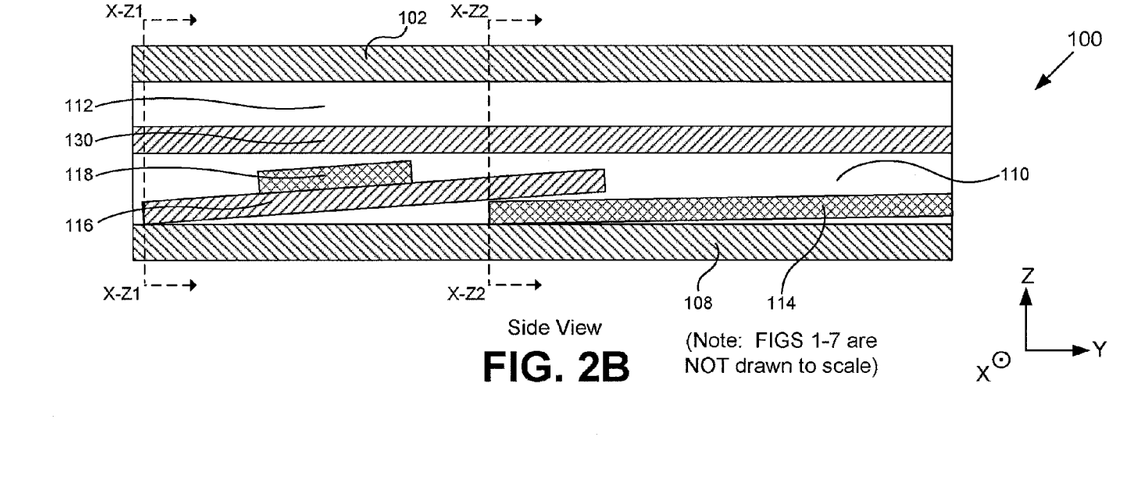
FIG. 2B is a cutaway side view of one embodiment of a portable video enhancement apparatus in portable mode along line Y-Z of FIG. 2A.

FIG. 2B is a cutaway side view of one embodiment of a portable video enhancement apparatus in portable mode along line Y-Z of FIG. 2A. FIG. 2B is substantially similar to FIG. 1, and thus, similar components are not described hereinagain. As shown in FIG. 2B, magnification lens 114, video device holder 116 and video device coupler 118 are situated within the collapsible housing and are substantially parallel to support members 102, 108. In one embodiment, magnification lens 114 is operatively coupled to support member 108 at line X-Z2 such that magnification lens 114 can pivot with respect to the Z-Y plane. In one embodiment, video device holder 116 is operatively coupled to support member 108 at line X-Z1 such that video device holder 116 can pivot with respect to the Z-Y plane.

To provide a better understanding of the operation of PVEA 100, an exemplary operation is now described with reference to FIGS. 1, 2A and 2B. The exemplary operation is based on using PVEA 100 with a video device such as a smartphone wherein PVEA 100 transforms from operational mode to portable mode. As shown in FIG. 1, PVEA 100 is in operational mode wherein the collapsible housing forms a substantially rectangular parallelopiped supported by magnification lens 114 and/or video device holder 116. A user inserts a smartphone into video device coupler 118 with the smartphone video display facing the positive Y direction. The user views the smartphone video display through magnification lens 114 (i.e., the user looks in the negative Y direction). When transforming to portable mode, the user removes the smartphone from video device coupler 118. Then, the user pivots magnification lens 114 and video device holder 116 with respect to the Z-Y plane so that magnification lens 114 and video device holder 116 are situated substantially parallel to support members 102, 108 within the collapsible housing as shown in FIG. 2B. Pivoting magnification lens 114 and video device holder 116 with respect to the Z-Y plane removes support for the collapsible housing, which allows the collapsible housing to form a relatively flat object having a relatively small volume as shown in FIG. 2A.

Figure 3:
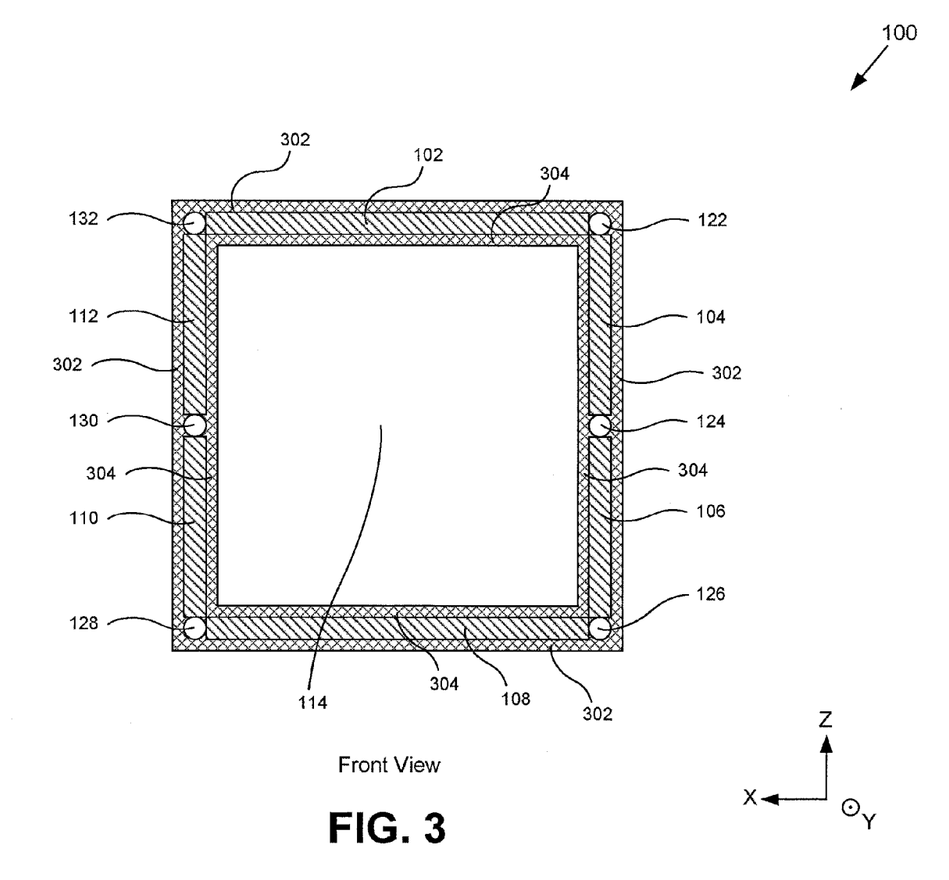
FIG. 3 is a front view of one embodiment of a portable video enhancement apparatus in operational mode.

FIG. 3 is a front view of one embodiment of a portable video enhancement apparatus in operational mode. FIG. 3 is substantially similar to FIG. 1, and thus, similar components are not described hereinagain. As shown in FIG. 3, portable video enhancement apparatus 100 includes exterior membrane 302 and interior membrane 304. Exterior membrane 302 and interior membrane 304 comprise a fabric material such cloth and textiles. In one embodiment exterior membrane 302 and interior membrane 304 comprise nylon fabric. In one embodiment exterior membrane 302 and interior membrane 304 comprise vinyl. In one embodiment exterior membrane 302 and interior membrane 304 comprise laminated plastic. In one embodiment exterior membrane 302 and interior membrane 304 comprise covered plastic. Exterior membrane 302 is situated on the exterior of the collapsible housing of PVEA 100. Interior membrane 304 is situated on the interior of the collapsible housing of PVEA 100. Exterior membrane 302 is operatively coupled to interior membrane 304 at the junctions between adjacent support members 102, 104, 106, 108, 110, 112. Thus, exterior membrane 302 and interior membrane 304 act as support couplers. Support coupler 122 is formed by operatively coupling exterior membrane 302 to interior membrane 304 at the junction between adjacent support members 102 and 104. Support coupler 124 is formed by operatively coupling exterior membrane 302 to interior membrane 304 at the junction between adjacent support members 104 and 106. Support coupler 126 is formed by operatively coupling exterior membrane 302 to interior membrane 304 at the junction between adjacent support members 106 and 108. Support coupler 128 is formed by operatively coupling exterior membrane 302 to interior membrane 304 at the junction between adjacent support members 108 and 110. Support coupler 130 is formed by operatively coupling exterior membrane 302 to interior membrane 304 at the junction between adjacent support members 110 and 112. Support coupler 132 is formed by operatively coupling exterior membrane 302 to interior membrane 304 at the junction between adjacent support members 112 and 102. In one embodiment, exterior membrane 302 is stitched to interior membrane 304 at the junctions between adjacent support members 102, 104, 106, 108, 110, 112. In one embodiment, exterior membrane 302 is glued to interior membrane 304 at the junctions between adjacent support members 102, 104, 106, 108, 110, 112.

Figure 4:
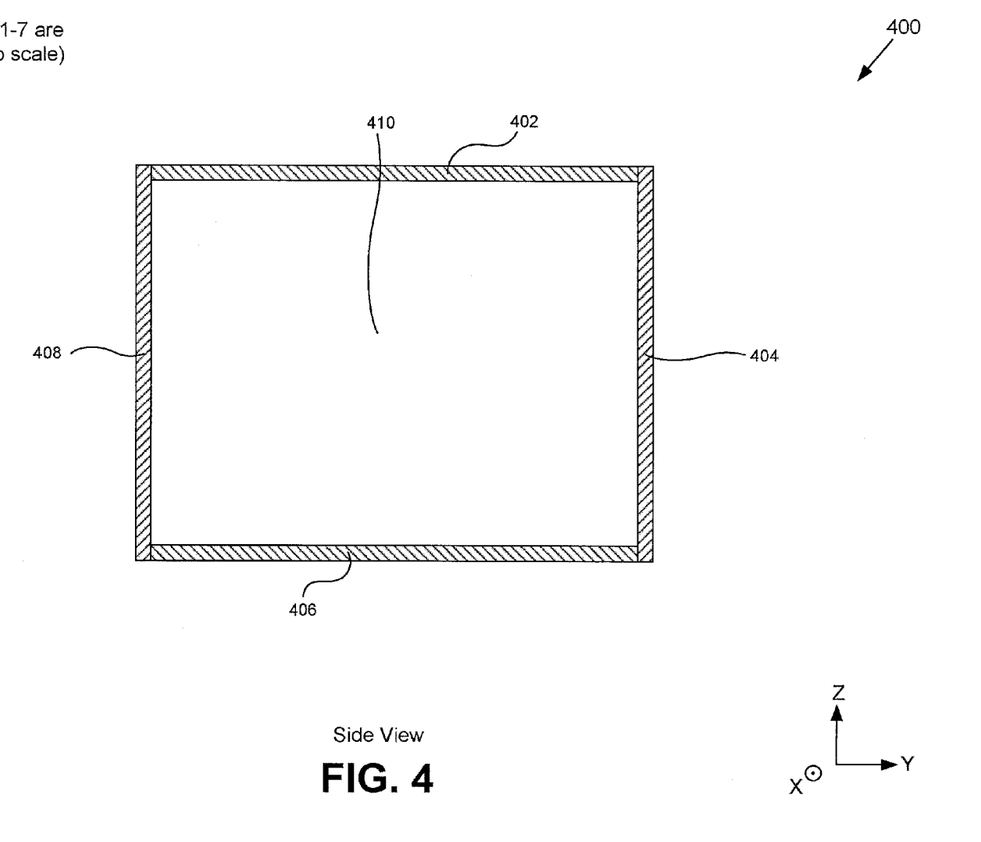
FIG. 4 is a side view of one embodiment of a support member of a portable video enhancement apparatus.

FIG. 4 is a side view of one embodiment of a support member of a portable video enhancement apparatus. Rigid frame support member 400 of FIG. 4 is an embodiment of support members 102, 104, 106, 108, 110, 112 of FIG. 1. As shown in FIG. 4, rigid frame support member 400 comprises rigid supports 402, 404, 406, 408 and frame membrane 410. Rigid supports 402, 404, 406, 408 comprise a durable, rigid material such as rigid wires, plastic, recycled plastic, polycarbonate, stainless steel, aluminum and titanium. In one embodiment, rigid supports 402, 404, 406, 408 comprise rigid wires. In one embodiment, rigid supports 402, 404, 406, 408 comprise rigid plastic. In one embodiment, rigid supports 402, 404, 406, 408 comprise rigid metal. In one embodiment, rigid supports 402, 404, 406, 408 comprise polycarbonate. Frame membrane 410 comprises an opaque material such as dark nylon fabric. In one embodiment, frame membrane 410 comprises black nylon fabric. In one embodiment, frame membrane 410 comprises nylon. In one embodiment, frame membrane 410 comprises hemp. In one embodiment, frame membrane 410 comprises plastic. In one embodiment, frame membrane 410 comprises cloth. Rigid supports 402, 404, 406, 408 are situated in a substantially rectangular configuration. Rigid support 402 is operatively coupled to rigid support 404 to form a substantially right angle with respect to the Z-Y plane. Rigid support 404 is operatively coupled to rigid support 406 to form a substantially right angle with respect to the Z-Y plane. Rigid support 406 is operatively coupled to rigid support 408 to form a substantially right angle with respect to the Z-Y plane. Rigid support 408 is operatively coupled to rigid support 402 to form a substantially right angle with respect to the Z-Y plane. In one embodiment, rigid supports 402, 404, 406, 408 are operatively coupled to each other using metal welds. Frame membrane 410 is operatively coupled to rigid supports 402, 404, 406, 408 so that frame membrane 410 is situated within the interior of the substantially rectangular configuration of rigid supports 402, 404, 406, 408. In one embodiment, frame membrane 410 is glued to rigid supports 402, 404, 406, 408.

Figure 5:
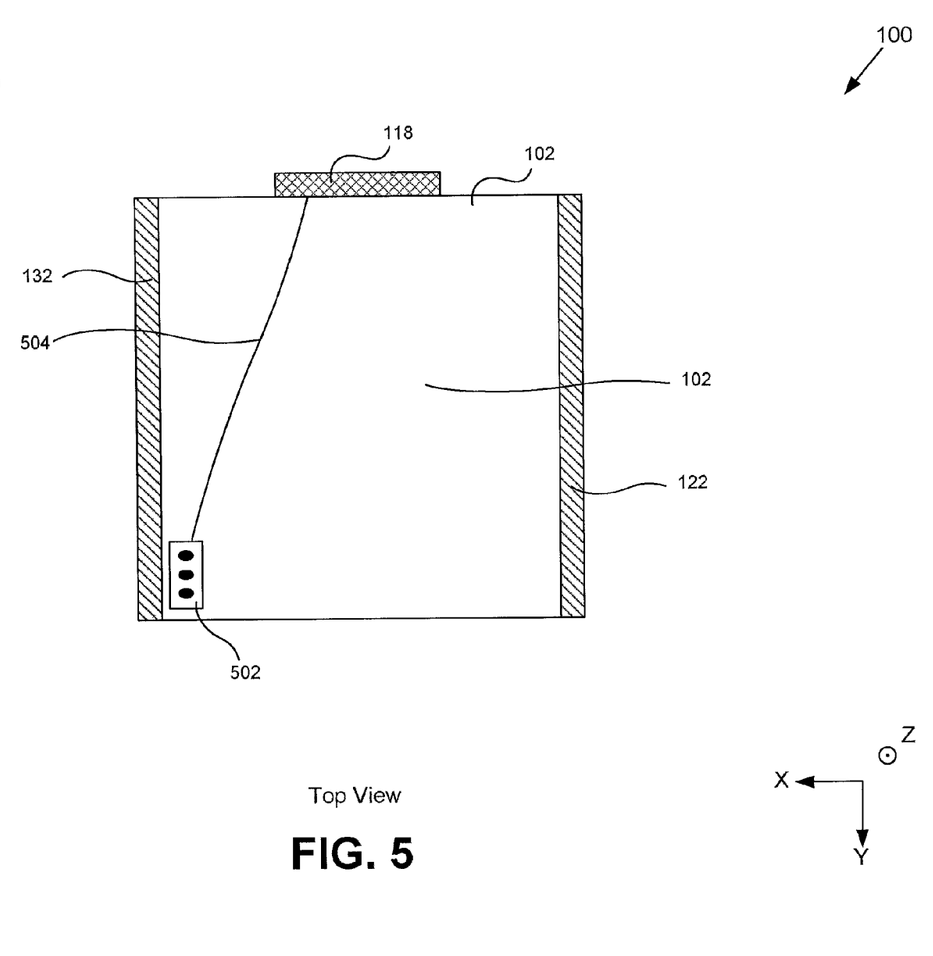
FIG. 5 is a top view of one embodiment of a portable video enhancement apparatus.

FIG. 5 is a top view of one embodiment of a portable video enhancement apparatus. FIG. 5 is substantially similar to FIG. 1, and thus, similar components are not described hereinagain. As shown in FIG. 5, remote controller 502 is operatively coupled to PVEA 100. In one embodiment, remote controller 502 is operatively coupled to PVEA 100 via a fastening means such as hook and loop material, magnets, glue and double-sided tape. Remote controller 502 is designed to allow a user to comfortably control a video device while viewing videos using PVEA 100 in operational mode. Remote controller 502 is operatively coupled to a video device via controller interface medium 504. In one embodiment, controller interface medium 504 comprises a wire. In one embodiment, controller interface medium 504 comprises a bluetooth radio frequency. In one embodiment, controller interface medium 504 comprises an infrared frequency.

Figure 6:
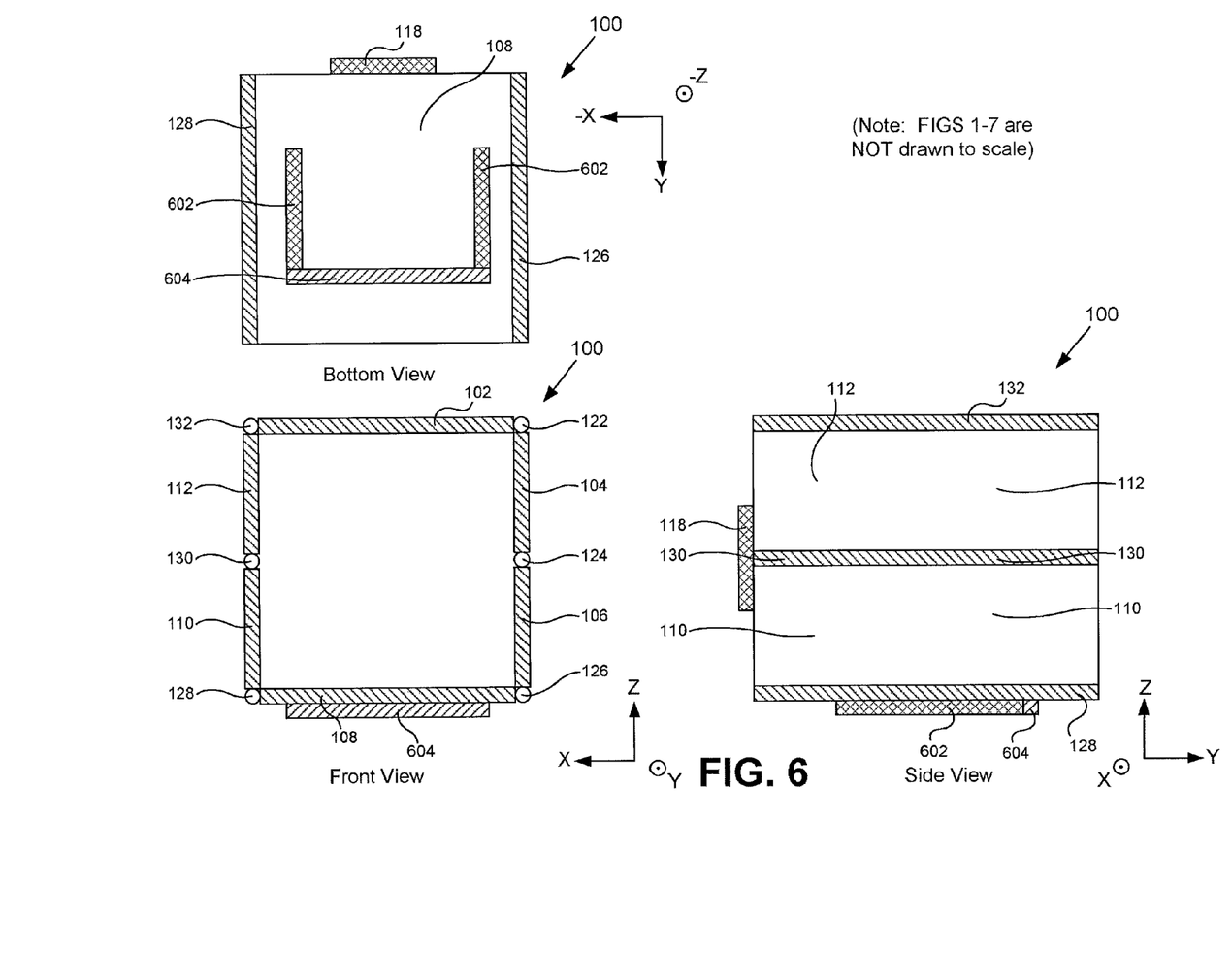
FIG. 6 is a front, side and bottom view of one embodiment of a portable video enhancement apparatus in operational mode.

FIG. 6 is a front, side and bottom view of one embodiment of a portable video enhancement apparatus in operational mode. FIG. 6 is substantially similar to FIG. 1, and thus, similar components are not described hereinagain. As shown in FIG. 6, portable video enhancement apparatus 100 includes viewing stand supports 602 and viewing stand coupler 604. Viewing stand supports 602 are operatively coupled to support member 108 via viewing stand coupler 604. Viewing stand supports 602 comprise a rigid material such as rigid wires, plastic, recycled plastic, polycarbonate, stainless steel, aluminum and titanium. In one embodiment, each viewing stand support 602 has the following dimensions: length approximately equal to 4 inches, width approximately equal to 0.25 inches and thickness approximately equal to 0.25 inches. In one embodiment, each viewing stand support 602 has a length approximately equal to between 3 inches and 5 inches. Viewing stand coupler 604 comprises a fastening means for operatively coupling viewing stand supports 602 to support member 108. Viewing stand coupler 604 is designed to allow viewing stand supports 602 to pivot with respect to the Z-Y plane. In one embodiment, viewing stand coupler 604 comprises tape such as duct tape, packing tape, masking tape and electrical tape. In one embodiment, viewing stand coupler 604 comprises a hinge. In one embodiment, viewing stand coupler 604 comprises hook and loop fasteners such as fasteners sold under the trademark VELCRO. In one embodiment, viewing stand coupler 604 comprises flexible glue. Viewing stand supports 602 are designed to pivot with respect to the Z-Y plane to facilitate unobtrusiveness when viewing support is unwanted and to provide support for PVEA 100 when viewing support is wanted. Viewing stand supports 602 are substantially parallel to support member 108 when viewing support is unwanted. Viewing stand supports 602 are designed to form a sufficient angle with respect to support member 108 relative to the Z-Y plane to support PVEA 100 on a substantially horizontal surface to facilitate viewing pleasure, which is now described with reference to FIG. 7.

Figure 7:
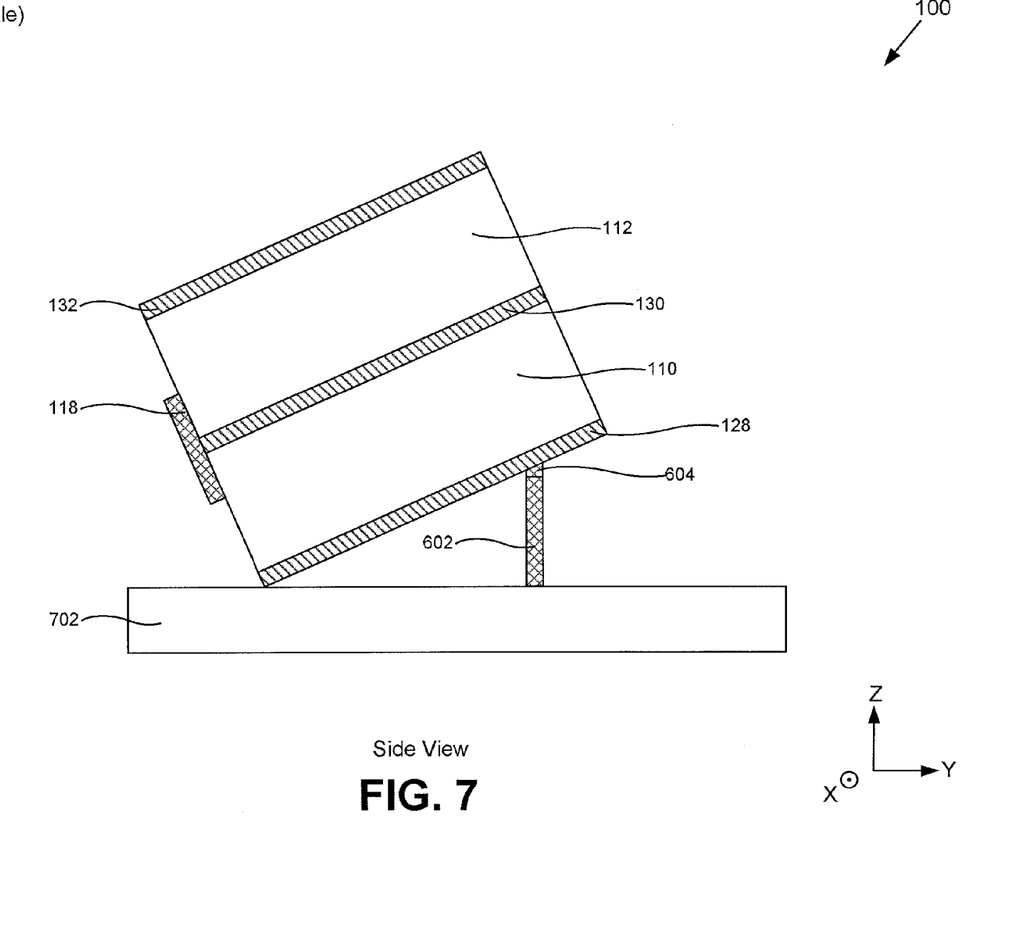
FIG. 7 is a side view of one embodiment of a portable video enhancement apparatus in operational mode.

FIG. 7 is a side view of one embodiment of a portable video enhancement apparatus in operational mode. FIG. 7 is substantially similar to FIGS. 1 and 6, and thus, similar components are not described hereinagain. As shown in FIG. 7, portable video enhancement apparatus 100 is supported on horizontal surface 702 at a comfortable viewing angle by viewing stand supports 602. Viewing stand supports 602 form approximately right angles with respect to horizontal surface 702.

What is claimed is:

1. An apparatus, comprising:
a magnification lens designed to magnify a video display of a video device;
a video device holder designed to mate with said video device;
a collapsible housing designed to provide a viewing cavity and a stable medium for said magnification lens and said video device holder in an operational mode configuration and to have a small volume in a portable mode configuration such that said apparatus is readily portable, comprising:
a first support member;
a second support member operatively coupled to said first support member via a first support coupler;
a third support member operatively coupled to said second support member via a second support coupler;
a fourth support member operatively coupled to said third support member via a third support coupler;
a fifth support member operatively coupled to said fourth support member via a fourth support coupler;
a sixth support member operatively coupled to said fifth support member via a fifth support coupler and operatively coupled to said first support member via a sixth support coupler;
wherein said video device holder is operatively coupled to said collapsible housing via one of said support members and resides within said collapsible housing;
wherein said magnification lens is operatively coupled to said collapsible housing via one of said support members and resides within said collapsible housing;
wherein said magnification lens and said video device holder are designed to be situated parallel to a viewing plane of said collapsible housing when in said operational mode configuration;
wherein said first support member has a length equal to between 6 inches and 8 inches, width equal to between 6 inches and 8 inches and thickness between 0.5 inches and 1 inch;
wherein said second and third support members each have a length equal to between 3 inches and 5 inches, width equal to between 2 inches and 4 inches and thickness between 0.05 inches and 1 inch;
wherein said fourth support member has a length equal to between 6 inches and 8 inches, width equal to between 6 inches and 8 inches and thickness between 0.5 inches and 1 inch;
wherein said fifth and sixth support members each have a length equal to between 3 inches and 5 inches, width equal to between 2 inches and 4 inches and thickness between 0.05 inches and 1 inch.

2. The apparatus of claim 1, wherein said magnification lens comprises a Fresnel lens.

3. The apparatus of claim 1, wherein said magnification lens and said video device holder are designed to pivot within said collapsible housing to facilitate supporting said collapsible housing in operational mode configuration and to facilitate being situated flat within said collapsible housing in portable mode configuration.

4. The apparatus of claim 1, wherein said video device holder further comprises a video device coupler comprising walls forming a rectangular cavity designed to retain a rectangular video device.

5. The apparatus of claim 1, wherein said first support member has a length equal to 6.69 inches, width equal to 6.53 inches and thickness equal to 0.078 inches; said second and third support members each have a length equal to 3.346 inches, width equal to 2.14 inches and thickness equal to 0.078 inches;
said fourth support member has a length equal to 6.69 inches, width equal to 6.53 inches and thickness equal to 0.078 inches;
said fifth and sixth support members each have a length equal to 3.34 inches, width equal to 2.14 inches and thickness equal to 0.078 inches.

6. The apparatus of claim 1, wherein said support members comprise a material selected from the group consisting of plastic, polycarbonate, stainless steel, aluminum, recycled plastic and titanium.

7. The apparatus of claim 1, wherein said support couplers comprise a fastening means selected from the group consisting of membrane stitching, hinges, KEVLAR tape, hook and loop fasteners and flexible glue.

8. The apparatus of claim 1, wherein said apparatus further comprises: an exterior membrane situated exterior of said collapsible housing; an interior membrane situated interior of said collapsible housing; wherein said support couplers comprise stitching said exterior membrane to said interior membrane at junctions between adjacent said support members.

9. The apparatus of claim 8, wherein said exterior and interior membranes comprise a material selected from the group consisting of nylon, covered plastic, vinyl, laminated plastic, cloth, fabric, nylon fabric and textiles.

10. The apparatus of claim 1, wherein each of said support members comprises a rigid frame support member, comprising: a plurality of rigid supports operatively coupled in a rectangular configuration; a frame membrane comprising an opaque material operatively coupled to said plurality of rigid supports and is situated within an interior of said rectangular configuration.

11. The apparatus of claim 10, wherein said frame membrane comprises a material selected from the group consisting of nylon, covered plastic, vinyl, laminated plastic, cloth, fabric, nylon fabric and textiles.

12. The apparatus of claim 10, wherein said plurality of rigid supports comprises a material selected from the group consisting of rigid wires, plastic, recycled plastic, polycarbonate, stainless steel, aluminum and titanium.

13. The apparatus of claim 1, wherein said apparatus further comprises a remote controller operatively coupled to said collapsible housing, designed to remotely operate a video playback device.

14. The apparatus of claim 1, wherein said apparatus further comprises: a viewing stand coupler operatively coupled to an exterior of said fourth support member; at least one viewing stand support operatively coupled to said viewing stand coupler; wherein said viewing stand support provides support for said collapsible housing on a horizontal surface to facilitate viewing pleasure; wherein said at least one viewing stand support is designed to remain situated parallel to said fourth support member when viewing support is unwanted.

15. The apparatus of claim 14, wherein said at least one viewing stand support comprises a rigid material selected from the group consisting of rigid wires, plastic, recycled plastic, polycarbonate, stainless steel, aluminum and titanium.

16. The apparatus of claim 14, wherein said viewing stand coupler comprises a fastening means selected from the group consisting of tape, hinges, hook and loop fasteners and flexible glue.

17. An apparatus, comprising:
a Fresnel lens designed to magnify a video display of a video device;
a video device holder designed to mate with said video device;
a collapsible housing designed to provide a viewing cavity and a stable medium for said Fresnel lens and said video device holder in an operational mode configuration and to have a small volume in a portable mode configuration such that said apparatus is readily portable, comprising:
a first support member;
a second support member operatively coupled to said first support member via a first support coupler;
a third support member operatively coupled to said second support member via a second support coupler;
a fourth support member operatively coupled to said third support member via a third support coupler;
a fifth support member operatively coupled to said fourth support member via a fourth support coupler;
a sixth support member operatively coupled to said fifth support member via a fifth support coupler and operatively coupled to said first support member via a sixth support coupler;
wherein said video device holder is operatively coupled to said collapsible housing via one of said support members and resides within said collapsible housing;
wherein said Fresnel lens is operatively coupled to said collapsible housing via one of said support members and resides within said collapsible housing;
wherein said Fresnel lens and said video device holder are designed to be situated parallel to a viewing plane of said collapsible housing when in said operational mode configuration;
wherein said first support member has a length equal to between 6 inches and 8 inches, width equal to between 6 inches and 8 inches and thickness between 0.5 inches and 1 inch;
wherein said second and third support members each have a length equal to between 3 inches and 5 inches, width equal to between 2 inches and 4 inches and thickness between 0.05 inches and 1 inch;
wherein said fourth support member has a length equal to between 6 inches and 8 inches, width equal to between 6 inches and 8 inches and thickness between 0.5 inches and 1 inch;
wherein said fifth and sixth support members each have a length equal to between 3 inches and 5 inches, width equal to between 2 inches and 4 inches and thickness between 0.05 inches and 1 inch.

18. The apparatus of claim 17, wherein said Fresnel lens and said video device holder are designed to pivot within said collapsible housing to facilitate supporting said collapsible housing in operational mode configuration and to facilitate being situated flat within said collapsible housing in portable mode configuration.

19. An apparatus, comprising:
a Fresnel lens designed to magnify a video display of a video device;
a video device holder designed to mate with said video device;
a collapsible housing designed to provide a viewing cavity and a stable medium for said Fresnel lens and said video device holder in an operational mode configuration and to have a small volume in a portable mode configuration such that said apparatus is readily portable, comprising:
a first support member;
a second support member operatively coupled to said first support member via a first support coupler;
a third support member operatively coupled to said second support member via a second support coupler;
a fourth support member operatively coupled to said third support member via a third support coupler;
a fifth support member operatively coupled to said fourth support member via a fourth support coupler;

a sixth support member operatively coupled to said fifth support member via a fifth support coupler and operatively coupled to said first support member via a sixth support coupler;

wherein said video device holder is operatively coupled to said collapsible housing via one of said support members and resides within said collapsible housing;

wherein said Fresnel lens is operatively coupled to said collapsible housing via one of said support members and resides within said collapsible housing;

wherein said Fresnel lens and said video device holder are designed to be situated parallel to a viewing plane of said collapsible housing when in said operational mode configuration;

wherein said Fresnel lens and said video device holder are designed to pivot within said collapsible housing to facilitate supporting said collapsible housing in operational mode configuration and to facilitate being situated flat within said collapsible housing in portable mode configuration;

wherein said video device holder further comprises a video device coupler comprising walls forming a rectangular cavity designed to retain a rectangular video device;

wherein said first support member has a length equal to between 6 inches and 8 inches, width equal to between 6 inches and 8 inches and thickness between 0.5 inches and 1 inch;

wherein said second and third support members each have a length equal to between 3 inches and 5 inches, width equal to between 2 inches and 4 inches and thickness between 0.05 inches and 1 inch;

wherein said fourth support member has a length equal to between 6 inches and 8 inches, width equal to between 6 inches and 8 inches and thickness between 0.5 inches and 1 inch;

wherein said fifth and sixth support members each have a length equal to between 3 inches and 5 inches, width equal to between 2 inches and 4 inches and thickness between 0.05 inches and 1 inch.

\* \* \* \* \*